US006959931B2

(12) United States Patent
Sakamaki et al.

(10) Patent No.: US 6,959,931 B2
(45) Date of Patent: Nov. 1, 2005

(54) KEYLESS CHUCK AND ASSOCIATED METHOD

(75) Inventors: Kazuo Sakamaki, Ojiya (JP); Akira Sakamaki, Ojiya (JP); Chokichi Sato, Ojiya (JP); Tadashi Taniguchi, Ojiya (JP)

(73) Assignee: Yukiwa Seiko Inc., Ojiya (JP)

( * ) Notice: Subject to any disclaimer, the term of this patent is extended or adjusted under 35 U.S.C. 154(b) by 103 days.

(21) Appl. No.: 10/421,662

(22) Filed: Apr. 23, 2003

(65) Prior Publication Data

US 2004/0021275 A1 Feb. 5, 2004

Related U.S. Application Data

(63) Continuation-in-part of application No. 09/983,499, filed on Oct. 23, 2001, now Pat. No. 6,659,474.

(30) Foreign Application Priority Data

Aug. 30, 2001 (JP) ........................................ 2001-260708

(51) Int. Cl.[7] .............................................. B23B 31/12
(52) U.S. Cl. ......................... 279/62; 279/140; 279/902; 29/436; 29/455.1; 29/525
(58) Field of Search .............................. 279/60, 61, 62, 279/125, 140, 902; 29/436, 455.1, 525

(56) References Cited

U.S. PATENT DOCUMENTS

| 4,840,387 A | 6/1989 | McCarthy |
| 4,930,793 A | 6/1990 | Ando |
| 4,951,955 A | 8/1990 | Sakamaki |
| 5,009,439 A | 4/1991 | Sakamaki |
| 5,044,643 A | 9/1991 | Nakamura |
| 5,145,193 A | 9/1992 | Rohm |
| 5,193,824 A | 3/1993 | Salpaka |
| 5,234,223 A | 8/1993 | Sakamaki |
| 5,452,906 A | 9/1995 | Huff et al. |
| 5,458,345 A | 10/1995 | Amyot |
| 5,476,273 A | 12/1995 | Shadeck et al. |
| 5,499,828 A * | 3/1996 | Salpaka et al. ................ 279/62 |
| 5,503,409 A * | 4/1996 | Rohm .......................... 279/62 |
| 5,573,254 A | 11/1996 | Huff et al. |

(Continued)

FOREIGN PATENT DOCUMENTS

| DE | 34 39 668 A1 | 10/1984 |
| DE | 44 38 991 A1 | 10/1984 |
| EP | 0 300 375 A1 | 1/1989 |
| EP | 0 710 518 B1 | 4/1995 |

*Primary Examiner*—Derris H. Banks
*Assistant Examiner*—Michael W. Talbot
(74) *Attorney, Agent, or Firm*—Alston & Bird LLP

(57) ABSTRACT

A keyless chuck is provided, comprising a generally cylindrical body having a forward and rearward portion with respect to an axis, the forward portion including a radially outwardly projecting portion of the body. The body further includes a plurality of guides extending obliquely to the axis and converging toward the forward section, and a groove extending around the body. Each of a plurality of jaws is slidably disposed within a respective guide and includes a thread section along an outer surface thereof. A jaw-engaging mechanism is configured to operably engage the groove so as to be rotatable around the body, and includes a thread section configured to complementarily engage the thread sections of the jaws. A sleeve extends over the jaw-engaging mechanism. A retaining member is disposed substantially within the sleeve, and is operably engaged with and extends between the body and the sleeve, rearwardly of the radially outwardly projecting portion of the body. The retaining member thereby axially constrains the sleeve with respect to movement toward the forward portion of the body. An associated method is also provided.

12 Claims, 3 Drawing Sheets

U.S. PATENT DOCUMENTS

| | | |
|---|---|---|
| 5,765,839 A | 6/1998 | Rohm |
| 5,829,761 A | 11/1998 | Rohm |
| 6,173,972 B1 | 1/2001 | Temple-Wilson et al. |
| 6,341,783 B1 * | 1/2002 | Rohm ........................ 279/62 |
| 6,517,088 B1 | 2/2003 | Röhm |
| 6,550,785 B2 | 4/2003 | Röhm |
| 2002/0000698 A1 * | 1/2002 | Rohm ........................ 279/62 |
| 2002/0109307 A1 * | 8/2002 | Rohm et al. ................... 279/62 |
| 2003/0042692 A1 * | 3/2003 | Sakamaki et al. ............ 279/62 |
| 2003/0141676 A1 * | 7/2003 | Sakamaki et al. ............ 279/62 |

* cited by examiner

KEYLESS CHUCK AND ASSOCIATED METHOD

CROSS-REFERENCES TO RELATED APPLICATIONS

This application is a continuation-in-part of U.S. Patent Application Ser. No. 09/983,499, filed Oct. 23, 2001 now U.S. Pat. No. 6,659,474, which claims priority from Japanese Patent Application No. 2001-260708, filed Aug. 30, 2001, each of these applications being incorporated herein by reference in their entirety.

BACKGROUND OF THE INVENTION

1. Field of the Invention

The present invention relates to drill chucks and, more particularly, to a keyless chuck and associated method.

2. Description of Related Art

A standard drill chuck has a body centered on and rotatable about an axis and typically includes a plurality of angled guides extending obliquely to the axis and opening toward the forward end of the chuck. A corresponding plurality of jaws are slidably engaged with the guides, each jaw having a threaded portion. An axially fixed ring is rotatably engaged with the body and is threaded on the inner surface thereof. The threads of the ring mesh with the threaded portions of the jaws such that rotation of the ring about the body displaces the jaws along the guides. Typically, the ring is rotated until the jaws converge toward the axis about the forward end of the chuck, thereby tightening an object or tool between the jaws. A chuck key is then operated between the ring and the body, and used to further tighten (or loosen) the jaws about the tool. However, such a keyed drill chuck requires manual tightening and loosening of the jaws with the chuck key, wherein the chuck key may be easily lost or misplaced, thereby disadvantageously rendering the keyed drill chuck unusable.

Keyless drill chucks represent an improvement over a standard keyed drill chuck in that the need for a chuck key is eliminated. Keyless drill chucks generally include a mechanism configured to engage the ring that cooperates with the jaws to move the jaws in the guides. Such a mechanism may be complex, often requiring multiple cooperating parts. In order to protect the mechanism against, for example, contamination, damage to the chuck or the workpiece, or injury to the operator, the mechanism may be housed in one or more sleeves extending over the mechanism and the body of the chuck. However, heretofore, one of the challenges with keyless drill chucks has been appropriately securing the one or more sleeves in proper position about the mechanism and the body, while allowing the one or more sleeves to have the necessary operability for implementing the function of the mechanism, and while allowing the chuck to be readily assembled and disassembled.

In some instances, external fasteners, such as clips or the like, have been used to secure the one or more sleeves to the body after being inserted thereon. Such a configuration is shown, for example, in U.S. Pat. No. 4,840,387 to McCarthy. However, external fasteners may disadvantageously be prone to accidental disengagement during use of the chuck, the fastener may become unsecured and lost, may cause damage to the workpiece or injury to the operator, or may not be particularly aesthetically pleasing.

In other instances, internal fasteners may be used such as shown, for example, in U.S. Pat. No. 5,573,254 to Huff et al. However, the internal fastener as shown in one embodiment of the Huff '254 reference is assembled toward the forward end of the body before the one or more sleeves are assembled over the body. The fastener is configured to be deformed by the one or more sleeves inserted thereover, wherein teeth or tabs on the fastener are intended to deform and dig into the inner mating surface of a plastic sleeve so as to secure the sleeve in place. However, such deformation-type fasteners may make the chuck difficult to assemble and, if the fastener does not properly secure the sleeve as the sleeve is first installed, the chuck must be disassembled and the fastener replaced or reworked before further attempts can be made to secure the sleeve to the body. Such a deformation-type fastener may also make the chuck difficult to disassemble and, if disassembly is necessary, the fastener will likely have to be replaced before the chuck can be reassembled.

Thus, there exists a need for a keyless chuck having minimal exposed components so as to minimize the risk of damage to a workpiece or the risk of injury to the operator. Minimal exposed components may also make the chuck more aesthetically pleasing. In addition, the components of the chuck should be assembled so as to minimize the possibility of components becoming accidentally disengaged and lost during use of the chuck. Further, such a chuck should desirably be assembled from components that are not required to permanently deform in order to provide the necessary function with respect to the chuck, and to promote ease of assembly and disassembly.

BRIEF SUMMARY OF THE INVENTION

The above and other needs are met by the present invention which, in one embodiment, provides a keyless chuck including a generally cylindrical body defining an axis and having a forward portion and a rearward portion with respect to the axis. The forward portion includes a radially outwardly projecting portion of the body, while the body further includes a plurality of guides extending obliquely to the axis and converging toward the forward section, as well as a groove extending around the body. Each of a plurality of jaws is slidably disposed within a respective guide and includes a thread section along an outer surface thereof. A jaw-engaging mechanism is configured to operably engage the groove and to be rotatable around the body, wherein the jaw-engaging mechanism includes a thread section configured to complementarily engage the thread sections of the jaws. A first sleeve extends over the jaw-engaging mechanism. A retaining member is disposed substantially within the first sleeve, and is operably engaged with and extends between the body and the first sleeve, rearwardly of the radially outwardly projecting portion of the body. The retaining member is thus configured to axially constrain the first sleeve with respect to movement toward the forward portion of the body.

Another advantageous aspect of the present invention comprises a method of assembling a keyless chuck, wherein the chuck includes a generally cylindrical body defining an axis and has a forward portion and a rearward portion with respect to the axis. The forward portion includes a radially outwardly projecting portion of the body, while the body further includes a plurality of guides extending obliquely to the axis and converging toward the forward section, and a groove extending around the body. The chuck also includes a plurality of jaws corresponding to the plurality of guides, with each jaw being slidably disposed within a respective guide, and including a thread section along an outer surface thereof. A jaw-engaging mechanism is configured to operably engage the groove and to be rotatable around the body, wherein the jaw-engaging mechanism includes a thread section configured to complementarily engage the thread sections of the jaws. Such a method first comprises inserting the body within a first sleeve. Thereafter, the first sleeve is secured to the body with a retaining member disposed substantially within the first sleeve, wherein the retaining member operably engages and extends between the body and the first sleeve, rearwardly of the radially outwardly projecting portion of the body, and wherein the retaining member is configured to axially constrain the first sleeve with respect to movement toward the forward portion of the body.

Thus, embodiments of the present invention provide a keyless chuck and associated method meeting the above-described needs and providing distinct advantages as detailed herein.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

Figure 1:
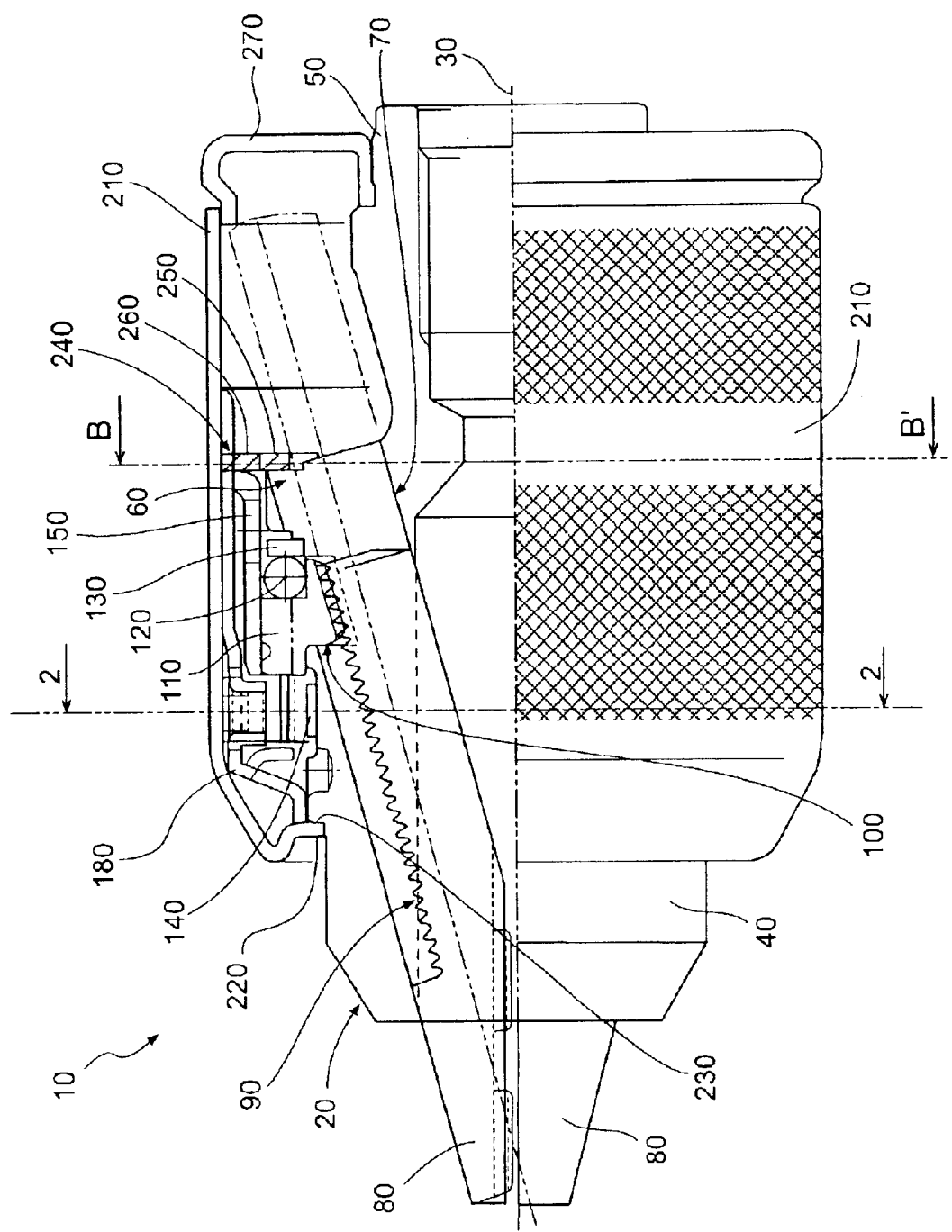
FIG. 1 is a partial cutaway drawing of a keyless chuck incorporating a concealed stop ring in accordance with one embodiment of the present invention.
Figures 2A, 2B:
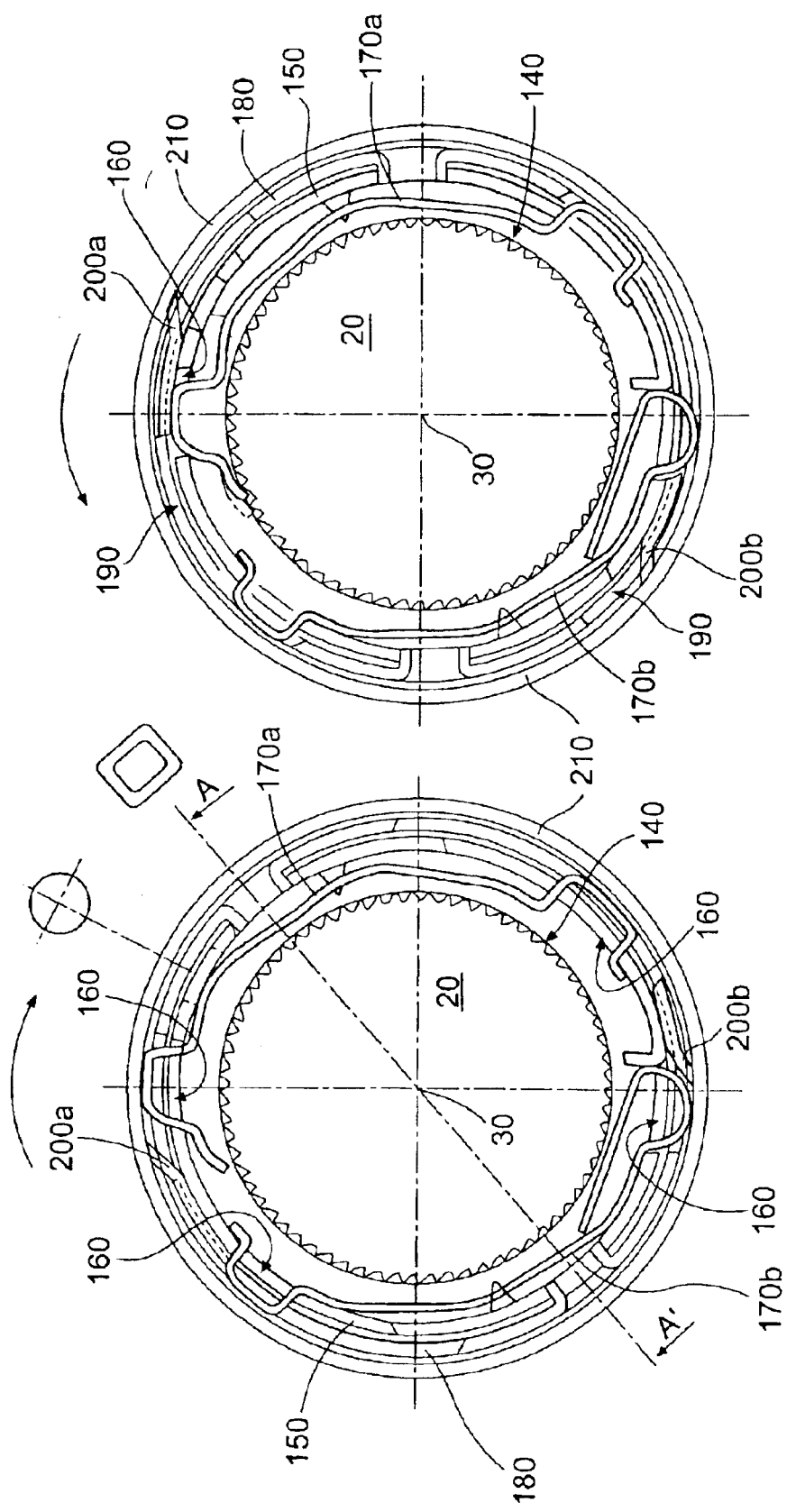
FIGS. 2A and 2B are cross-sectional views of a keyless chuck as shown in FIG. 1, taken along line 2—2 thereof and illustrating an operational sequence of the keyless chuck, according to one embodiment of the present invention.
Figure 3:
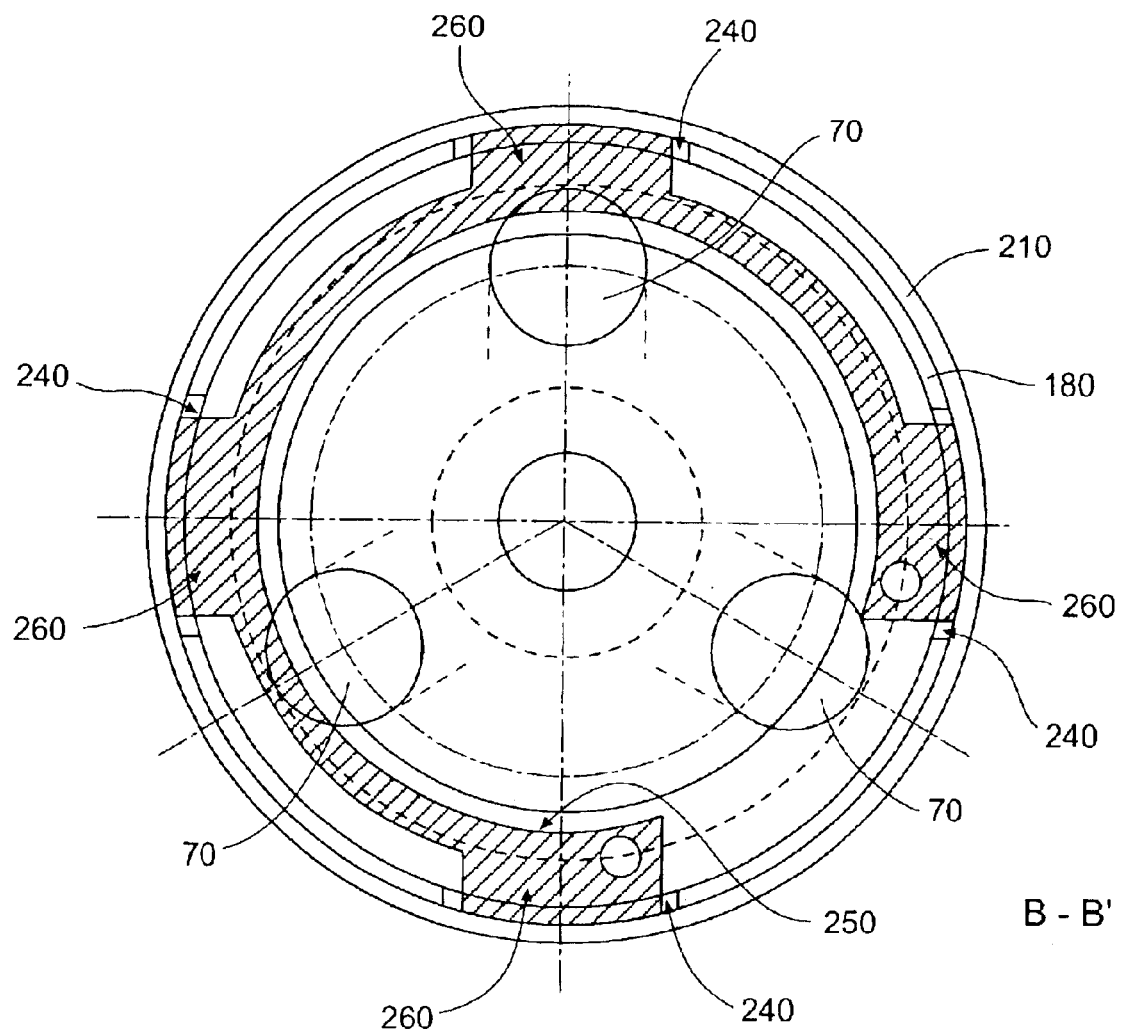
FIG. 3 is a cross-sectional view of a keyless chuck as shown in FIG. 1, taken along line B–B' thereof, illustrating a concealed stop ring in accordance with one embodiment of the present invention.

FIG. 1 illustrates a keyless chuck according to one embodiment of the present invention, the chuck being indicated generally by the numeral 10, configured to be used with a drill or other suitable tool as will be appreciated by one skilled in the art. FIGS. 2A, 2B, and 3 further illustrate various sections and views of the chuck 10. Such a chuck 10 includes a generally cylindrical body 20 defining an axis 30 and having a forward portion 40 and a rearward portion 50 with respect to the axis 30. In one embodiment, the body 20 further includes a radially outwardly projecting portion 60 wherein, in one instance, the radially outwardly projecting portion 60 is included in the forward portion 40 of the body 20. The body 20 also includes a plurality of guides 70 (as shown in FIGS. 1 and 3) disposed obliquely to the axis 30, the guides 70 converging toward the axis 30 toward the forward portion 40 of the body 20. The chuck 10 further includes a plurality of jaws 80 corresponding to the plurality of guides 70 and slidably disposed therein.

The jaws 80 are configured to extend and retract through the guides 70. More particularly, each jaw 80 includes a thread section 90, wherein the thread section 90 is configured to face radially outward of the body 20 when the jaws 80 are disposed within the guides 70. The body 20 also defines a circumferential groove 100, and the chuck 10 further includes a jaw-engaging mechanism such as, for example, a split nut 110 that is capable of rotating about the body 20 within the groove 100. The split nut 110 is threaded along the inward portion thereof, the threads thereof being capable of complementarily engaging the thread sections 90 of the jaws 80. In some instances, one or more ball bearings 120 may be disposed between the split nut 110 and a ball bearing receiver disk 130 operably engaged with the body 20, to reduce rotational friction between the split nut 110 and the body 20. In some instance, the body 20 may also include a plurality of axially-extending ridges 140 (as shown in FIGS. 2A and 2B) along the outer surface thereof.

The split nut 110 is configured in more than one portion so as to allow the split nut 110 to be assembled about the body 20 and within the groove 100. As such, the split nut 110 is secured in position about the body 20 by a cylindrical hoop 150, wherein the hoop 150 may be, for example, press-fit over the split nut 110 once the split nut 110 is assembled about the body 20. In one embodiment, the hoop 150 extends over the split nut 110 and the ridges 140 along the body 20. In some instances, the hoop 150 also defines a plurality of circumferentially-extending gaps 160 (as shown in FIGS. 2A and 2B) about the edge of the hoop 150 directed toward the forward portion 40 of the body 20, wherein the gaps 160 generally correspond to the ridges 140 when the hoop 150 is secured over the split nut 110. According to some embodiments, one or more spring members 170a, 170b may be engaged with the gaps 160 and held in place thereby such that portions of the spring members 170a, 170b extend through the gaps 160 so as to be positioned over the ridges 140.

An intermediate sleeve 180, which may be comprised of a metal, is positioned over the hoop 150 and the one or more spring members 170a, 170b such that the intermediate sleeve 180 is at least partially rotatable with respect to the hoop 150. In some instances, the intermediate sleeve 180 defines openings 190 toward the forward portion 40 of the body 20 that may be configured to engage portions of the spring members 170a, 170b extending through the hoop 150. Some of the openings 190 include tabs 200a, 200b configured to engage the spring members 170a, 170b, respectively, and to urge the spring members 170a, 170b radially inwardly toward the body 20 when a relative torque is attained between the hoop 150 and intermediate sleeve 180 such as, for example, when the jaws 80 are initially tightened about an object or tool. As a result, at least one of the spring members 170a is forced against the ridges 140 extending along the body 20 which, for example, may provide a ratcheting noise to the user to indicate continued tightening of the chuck 10 about the object. After the chuck 10 is sufficiently tightened about the object, at least one of the spring members 170a further cooperates with the ridges 140 so as to prevent the chuck 10 from loosening about the object. As will be apparent, however, the workings of the chuck 10 relative to these aspects are not necessary to the practice of the invention.

In some embodiments, an outer sleeve 210, which may be comprised of metal, may be fixedly secured such as, for example, by press-fitting, over the intermediate sleeve 180. In addition, at least one of the intermediate sleeve 180 and the outer sleeve 210 is configured to engage the body 20 such that, when the forward portion 40 of the body 20 is inserted into the intermediate sleeve 180/outer sleeve 210 assembly, the movement of the intermediate sleeve 180/ outer sleeve 210 assembly toward the rearward end 50 is limited. More particularly, for example, the outer sleeve 210 may include a lip 220 about an end thereof toward the forward portion 40 of the body 20, configured to interact with a flange portion 230 of the body 20. The fixed relation between the outer sleeve 210 and the intermediate sleeve 180 thereby limits the axial movement of the intermediate sleeve 180/outer sleeve 210 assembly toward the rearward end 50 of the body 20 when the lip 220 engages the flange portion 230.

According to one advantageous aspect of the present invention, the intermediate sleeve 180 defines one or more circumferentially-extending slots 240. In some instances, the slots 240 are located on the intermediate sleeve 180 such that, when the intermediate sleeve 180/outer sleeve 210 assembly is placed over the body 20 such that the lip 220 engages the flange portion 230, the slots 240 are disposed rearward-of the split nut 110. In one particular instance, the slots 240 are located on the intermediate sleeve 180 so as to be disposed rearward of the radially outwardly projecting portion 60 of the body 20 when the lip 220 engages the flange portion 230. Once the intermediate sleeve 180/outer sleeve 210 assembly is placed over the body 20 in this manner, a retaining member such as, for example, a stop ring 250, is inserted into the intermediate sleeve 180 and into engagement with the slots 240 from the rearward direction.

In some instances, the stop ring 250 may comprise a C-shaped stop ring (as shown in FIG. 3) comprised of a resilient material. Accordingly, when the ends of the C-shaped stop ring 250 are urged toward each other, the diameter of the stop ring 250 is effectively reduced, the diameter being restored when the ends of the stop ring 250 are released. The stop ring 250 includes one or more radially-extending portions such as, for example, tabs 260, about the outer circumference thereof such that, when the stop ring 250 is inserted into the intermediate sleeve 180 and released, the stop ring 250 expands and the tabs 260 engage the slots 240 and secure the stop ring 250 with respect to the intermediate sleeve 180. When engaged with the slots 240, the stop ring 250 is disposed substantially within the intermediate sleeve 180, so as to be essentially concealed, and extends from the intermediate sleeve 180 radially inward toward the body 20. Preferably, the stop ring 250 is configured to extend radially inward of the radially outwardly projecting portion 60 of the body and, in some instances, extends radially inward of the split nut 110. In one advantageous instance, the stop ring 250, when engaged with the intermediate sleeve 180, is configured to extend radially inward of the radially outwardly projecting portion 60 of the body 20 so as to be capable of bearing against the rearward face thereof, the rearward face being disposed toward the rearward portion 50 of the body, when the intermediate sleeve 180/outer sleeve 210 assembly is urged axially toward the forward portion 40 of the body 20. The intermediate sleeve 180/outer sleeve 210 assembly is thereby secured about the body 20 and axially constrained with respect to movement toward the forward portion 40 of the body 20 by the stop ring 250. In applications where the drill or tool includes a lockable spindle, a stationary ring 270 may be attached at the rear of the chuck 10 so as to cover any gap between the body 20 and the intermediate sleeve 180/outer sleeve 210 assembly. For applications where the spindle cannot be locked, which is typical with handheld drills, for example, the stationary ring 270 can be replaced with a rear sleeve (not shown) configured to allow the body 20 to be held against rotation when the outer sleeve 210 is rotated.

In operation, in order to close the jaws 80 about an object, the outer sleeve 210 is rotated in one direction relative to the body 20 such that the intermediate sleeve 180, hoop 150, and split nut 110 rotate therewith. The rotation of the split nut 110, via the engagement of the respective thread portions, advances the jaws 80 along the guides 70 until the jaws 80 converge toward the axis 30 about the forward portion 40 of the body 20 to initially engage the object therebetween. Continued rotation of the outer sleeve 210 with respect to the body 20 causes the outer sleeve 210 and the intermediate sleeve 180 to rotate relative to the hoop 150, the relative rotation thereby causing the tabs 200a, 200b associated with the intermediate sleeve 180 to force the spring members 170a, 170b, respectively, radially inwardly to engage the ridges 140 and/or the tabs 200a, 200b, as described above. To release the object from the jaws 80, the outer sleeve 210 is rotated in a second direction, opposite to the first direction, with respect to the body 20 so as to disengage the spring member 170a from the ridges 140, whereafter continued rotation of the outer sleeve 210 in the second direction with respect to the body 20 retracts the jaws 80 along the guides 70 and loosens the jaws 80 until the object can be released.

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A keyless chuck, comprising:

a generally cylindrical body defining an axis and having a forward portion and a rearward portion with respect to the axis, the forward portion including a radially outwardly projecting portion of the body, the body further including a plurality of guides extending obliquely to the axis and converging toward the forward section, and a groove extending around the body;

a plurality of jaws corresponding to the plurality of guides, each jaw being slidably disposed within the respective guide and including a thread section along an outer surface thereof;

a jaw-engaging mechanism configured to operably engage the groove and to be rotatable around the body, the jaw-engaging mechanism including a thread section configured to complementarily engage the thread sections of the jaws;

a sleeve extending over the jaw-engaging mechanism;

a cylindrical hoop press-fit with respect to and extending around the jaw-engaging mechanism and disposed between the jaw-engaging mechanism and the sleeve; and a retaining member disposed substantially within the sleeve, the retaining member being operably engaged with and extending between the body and the sleeve, rearwardly of the radially outwardly projecting portion of the body, the retaining member being configured to axially constrain the sleeve with respect to movement toward the forward portion of the body.

2. A chuck according to claim 1 wherein the sleeve comprises an inner sleeve press-fit into an outer sleeve.

3. A chuck according to claim 2 wherein the inner sleeve defines at least one circumferentially-extending slot.

4. A chuck according to claim 3 wherein the retaining member further comprises a C-shaped stop ring having at least one tab about an outer circumference thereof, the C-shaped stop ring being insertable into the sleeve such that, when the at least one tab engages the at least one circumferentially-extending slot, the C-shaped stop ring extends radially inward of the radially outwardly projecting portion of the body.

5. A chuck according to claim 4 wherein, when the at least one tab engages the at least one circumferentially-extending slot, the at least one radially outward adjacent the outer sleeve.

6. A chuck according to claim 3 wherein the retaining member further comprises a stop ring having a radially-extending portion, the stop ring being insertable into the sleeve so as to allow the radially-extending portion to engage the at least one circumferentially-extending slot, the stop ring further being configured to extend radially inward of the radially outwardly projecting portion of the body.

7. A chuck according to claim 1 wherein the retaining member is disposed rearwardly of the jaw-engaging mechanism.

8. A method of assembling a keyless chuck, the chuck including a generally cylindrical body defining an axis and having a forward portion and a rearward portion with respect to the axis, the forward portion including a radially outwardly projecting portion of the body, the body further including a plurality of guides extending obliquely to the axis and converging toward the forward section, and a groove extending around the body, the chuck further including a plurality of jaws corresponding to the plurality of guides, each jaw being slidably disposed within the respective guide and including a thread section along an outer surface thereof, and a jaw-engaging mechanism configured to operably engage the groove and to be rotatable around the body, the jaw-engaging mechanism including a thread section configured to complementarily engage the thread sections of the jaws, said method comprising:

inserting the body within a sleeve;

press-fitting a cylindrical hoop around the jaw-engaging mechanism such that the hoop is disposed between the jaw-engaging mechanism and the sleeve; and securing the sleeve to the body with a retaining member disposed substantially within the sleeve, the retaining member oporably engaging and extending between the body and the sleeve, rearwardly of the radially outwardly projecting portion of the body, the retaining member being configured to axially constrain the sleeve with respect to movement toward the forward portion of the body.

9. A method according to claim 8 wherein the sleeve defines at least one circumferentially-extending slot and the retaining member further comprises a C-shaped stop ring having at least one tab about an outer circumference thereof, and wherein securing the sleeve to the body further comprises inserting the C-shaped stop ring into the sleeve such that, when the at least one tab engages the at least one circumferentially-extending slot, the C-shaped stop ring extends radially inward of the radially outwardly projecting portion of the body.

10. A method according to claim 8 further comprising press-fitting an inner sleeve into an outer sleeve to form the sleeve.

11. A method according to claim 8 wherein the sleeve defines at least one circumferentially-extending slot and the retaining member further comprises a stop ring having a radially-extending portion, and wherein securing the sleeve to the body further comprises inserting the stop ring into the sleeve such that, when the radially-extending portion engages the at least one circumferentially-extending slot, the stop ring extends radially inward of the radially outwardly projecting portion of the body.

12. A method according to claim 8 wherein securing the sleeve to the body further comprises operably engaging the retaining member between the body and the sleeve rearwardly of the jaw-engaging mechanism.

* * * * *